United States Patent
Owoeye

(10) Patent No.: US 12,044,170 B2
(45) Date of Patent: Jul. 23, 2024

(54) CLOSED-LOOP COOLING SYSTEM FOR A GAS TURBINE ENGINE

(71) Applicant: General Electric Company, Schenectady, NY (US)

(72) Inventor: Eyitayo James Owoeye, Houston, TX (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 17/940,053

(22) Filed: Sep. 8, 2022

(65) Prior Publication Data
US 2024/0084733 A1 Mar. 14, 2024

(51) Int. Cl.
*F02C 7/12* (2006.01)

(52) U.S. Cl.
CPC ............ *F02C 7/12* (2013.01); *F05D 2240/12* (2013.01); *F05D 2260/205* (2013.01)

(58) Field of Classification Search
CPC ...... F01D 5/18; F02C 7/18; F02C 7/16; F02C 7/185; F05D 2260/213; F04D 2240/12; F04D 2260/205
See application file for complete search history.

(56) References Cited

U.S. PATENT DOCUMENTS

| | | | |
|---|---|---|---|
| 3,355,883 A * | 12/1967 | Beam, Jr. | F02C 7/14 416/198 A |
| 6,098,395 A * | 8/2000 | North | F01D 5/085 60/782 |
| 7,296,973 B2 | 11/2007 | Lee et al. | |
| 7,611,326 B2 | 11/2009 | Trindade et al. | |
| 8,087,249 B2 | 1/2012 | Ottaviano et al. | |
| 8,858,161 B1 * | 10/2014 | Ryznic | F02C 7/16 415/115 |
| 9,382,810 B2 * | 7/2016 | Lacy | F01D 25/12 |
| 9,599,017 B2 | 3/2017 | Joshi et al. | |
| 10,400,675 B2 | 9/2019 | Sennoun et al. | |
| 11,261,792 B2 | 3/2022 | Niergarth et al. | |
| 2012/0243970 A1 * | 9/2012 | Hellgren | F01D 5/187 415/178 |
| 2016/0069264 A1 | 3/2016 | Brostmeyer et al. | |
| 2017/0159675 A1 * | 6/2017 | Sennoun | F02K 3/06 |
| 2018/0328210 A1 | 11/2018 | Moll et al. | |

FOREIGN PATENT DOCUMENTS

WO WO9848161 A1 10/1998

* cited by examiner

*Primary Examiner* — Courtney D Heinle
*Assistant Examiner* — Andrew Thanh Bui
(74) *Attorney, Agent, or Firm* — Dority & Manning, P.A.

(57) ABSTRACT

A closed-loop cooling system for a gas turbine engine, comprising: a pump having a pump inlet and a pump outlet; a first plurality of stator vanes defining first cooling cavities therein; and a second plurality of stator vanes, defining second cooling cavities therein, wherein the pump drives a working fluid from the pump outlet, through the first cooling cavities of the first plurality of stator vanes, through the cooling cavities of the second plurality of stator vanes and back to the pump inlet.

18 Claims, 12 Drawing Sheets

CLOSED-LOOP COOLING SYSTEM FOR A GAS TURBINE ENGINE

FIELD

The present disclosure relates to a gas turbine engine and more particularly, to a closed-loop cooling system for a gas turbine engine.

BACKGROUND

Gas turbine engines, such as turbofan engines, may be used for aircraft propulsion. Gas turbine engines operate at extremely high internal temperatures. Certain hot gas path components of the gas turbine engine, such as compressor and turbine stator vanes and rotor blades, are exposed to extremely high working gas temperatures which affects the overall life expectancy of those components.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
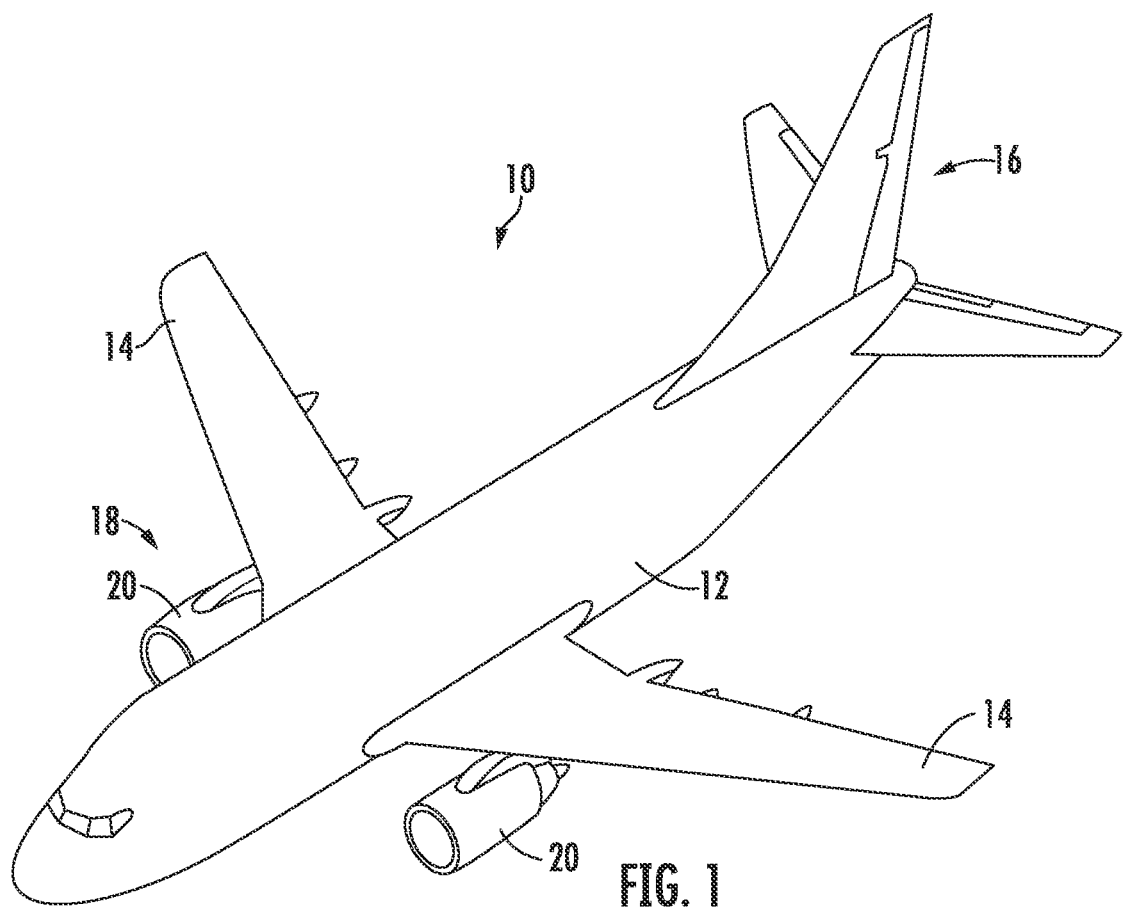
FIG. 1 is perspective view of an exemplary aircraft in accordance with an exemplary aspect of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

The term "turbomachine" or "turbomachinery" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

Extreme compressor air and combustion gas temperatures within a gas flow path of a gas turbine engine are required for efficient operation of the gas turbine engine. However, these extreme temperatures are a limiting factor when determining the overall life expectancy of various hot gas path components such as stator vanes and rotor blades found in both the compressor and turbine sections of the engine.

The present disclosure is generally related to a closed-loop cooling system for cooling stator vanes disposed within the gas path of a gas turbine engine. The closed-loop cooling system transfers heat duty via a working fluid, from a first stage of stator vanes exposed to a first gas temperature to a second stage of stator vanes which are exposed to a second gas temperature which is lower than the first temperature in a closed cycle or circuit loop.

In certain configurations, the system includes a heat exchanger (with heat-sink fluids such as LH2, fuel, or air) on, e.g., a bypass circuit to further enable controlled high cooling loads capacity.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
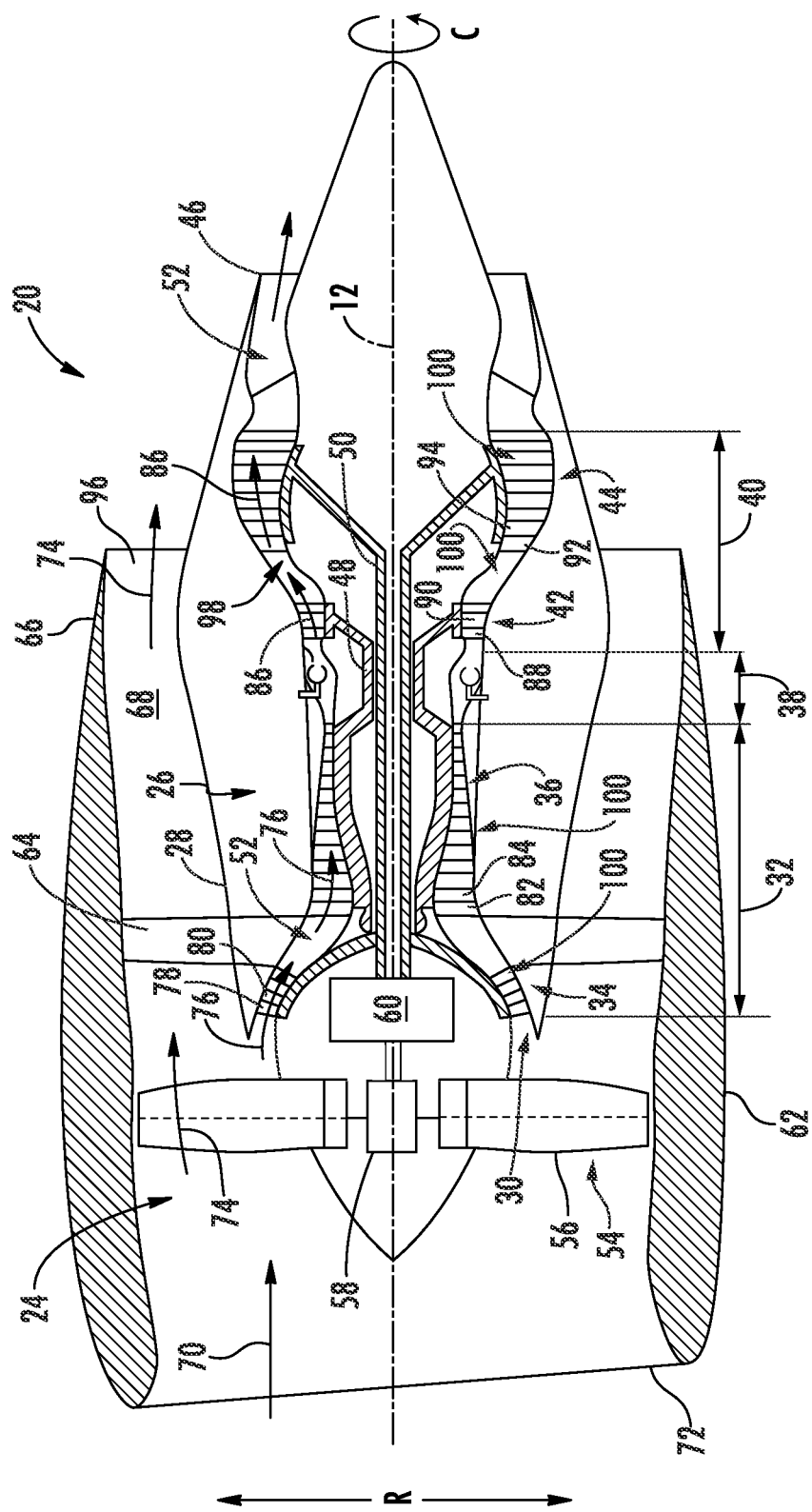
FIG. 2 is a schematic view of an exemplary gas turbine engine in accordance with an exemplary aspect of the present disclosure and that can be utilized on the aircraft of FIG. 1.

FIG. 2 is a schematic view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction A (extending parallel to a longitudinal centerline 22 provided for reference), a radial direction R, and a circumferential direction C extending about the axial or longitudinal centerline 22. In general, the gas turbine engine 20 includes a fan section 24 and a turbomachine 26 disposed downstream from the fan section 24.

The exemplary turbomachine 26 depicted generally includes an engine casing 28 that defines an annular compressor or core inlet 30. The engine casing 28 at least partially encases, in serial flow relationship, a compressor section 32 including a booster or low-pressure compressor 34 and a high-pressure compressor 36, a combustion section 38, a turbine section 40 including a high-pressure turbine 42 and a low-pressure turbine 44, and a jet exhaust nozzle 46.

A high-pressure shaft 48 drivingly connects the high-pressure turbine 42 to the high-pressure compressor 36. A low-pressure shaft 50 drivingly connects the low-pressure turbine 44 to the low-pressure compressor 34. The compressor section 32, combustion section 38, turbine section 40, and the jet exhaust nozzle 46 together define a working gas flow path 52 through the gas turbine engine 20.

For the embodiment depicted, the fan section 24 includes a fan 54 having a plurality of fan blades 56 coupled to a disk 58 in a circumferentially spaced apart manner. As depicted, the fan blades 56 extend radially outwardly from disk 58 generally along the radial direction R. The gas turbine engine 20 further includes a power gear box 60. The power gear box 60 includes a plurality of gears for adjusting a rotational speed of the fan 54 relative to a rotational speed of the low-pressure shaft 50, such that the fan 54 and the low-pressure shaft 50 may rotate at more efficient relative speeds.

The exemplary fan section 24 includes an annular fan casing or outer nacelle 62 that circumferentially surrounds the fan 54 and/or at least a portion of the turbomachine 26. The nacelle 62 is supported relative to the turbomachine 26 by a plurality of circumferentially spaced struts or bypass guide vanes 64 in the embodiment depicted. Moreover, a downstream section 66 of the nacelle 62 extends over an outer portion of the turbomachine 26 to define a bypass airflow passage 68 therebetween.

It should be appreciated, however, that the exemplary gas turbine engine 20 depicted in FIG. 2 is provided by way of example only, and that in other exemplary embodiments, the gas turbine engine 20 may have other configurations. For example, although the gas turbine engine 20 depicted is configured as a ducted gas turbine engine (i.e., including the outer nacelle 62), in other embodiments, the gas turbine engine 20 may be an unducted or non-ducted gas turbine engine (such that the fan 54 is an unducted fan, and the bypass guide vanes 64 are cantilevered from the engine casing 28).

Additionally, or alternatively, although the gas turbine engine 20 depicted is configured as a geared gas turbine engine (i.e., including the power gear box 60), in other embodiments, the gas turbine engine 20 may be configured as a direct drive gas turbine engine (such that the low-pressure shaft 50 rotates at the same speed as the fan 54). It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 20, a volume of air 70 enters the gas turbine engine 20 through an associated inlet 72 of the nacelle 62 and fan section 24. As the volume of air 70 passes across the fan blades 56, a first portion of air 74 is directed or routed into the bypass airflow passage 68. A second portion of air 76 is directed or routed into the working gas flow path 52, or more specifically into the compressor section 32 where the second portion of air 76 passes over alternating rows of stator vanes 78 and rotor blades 80 of the low-pressure compressor 34, and alternating rows of stator vanes 82 and rotor blades 84 of the high-pressure compressor 36. Pressure of the second portion of air 76 is sequentially increased as it is routed through the compressor section 32. The compressed second portion of air 76 is routed into the combustion section 38, where it is mixed with fuel and burned to provide combustion gases 86.

The combustion gases 86 are routed through the turbine section 40 entering the high-pressure turbine 42 first where a portion of thermal and/or kinetic energy from the combustion gases 86 is extracted via alternating rows of stator vanes 88 and rotor blades 90 that are coupled to the high-pressure shaft 48, thus causing the high-pressure shaft 48 to rotate, thereby supporting operation of the high-pressure compressor 36. The combustion gases 86 are then routed through the low-pressure turbine 44 where a second portion of thermal and kinetic energy is extracted from the combustion gases 86 via sequential stages of stator vanes 92 and turbine rotor blades 94 that are coupled to the low-pressure shaft 50, thus causing the low-pressure shaft 50 to rotate, thereby supporting operation of the low-pressure compressor 34 and/or rotation of the fan 54.

The combustion gases 86 are subsequently routed through the jet exhaust nozzle 46 of the turbomachine 26 to provide propulsive thrust. Simultaneously, the pressure of the first portion of air 74 is substantially increased as it is routed through the bypass airflow passage 68 before it is exhausted from a fan exhaust nozzle section 96 of the gas turbine engine 20, also providing propulsive thrust. The high-pressure turbine 42, the low-pressure turbine 44, and the fan exhaust nozzle section 96 at least partially define a hot gas path 98 for routing the combustion gases 86 through the turbomachine 26.

Compression of the second portion of air 76 raises the temperature of the air as it is routed through the compressor section 32 upstream from the combustion section 38. Thermal energy is transferred to the stator vanes 78, 82 in both the low-pressure compressor 34 and the high-pressure compressor 36. In addition, the combustion gases 86 transfer thermal energy to the stator vanes 88 of the high-pressure turbine 42 and to the stator vanes 92 of the low-pressure turbine 44. The thermal energy transferred will, over time, affect the useful life expectancy of the stator vanes. As such, cooling of these gas flow path components is desirable.

Figure 3:
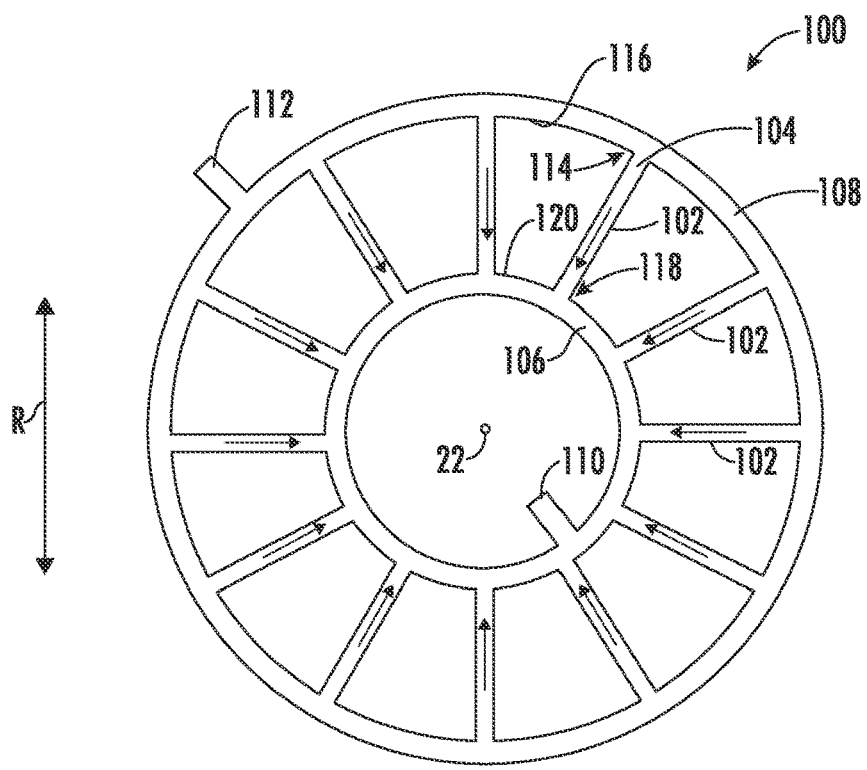
FIG. 3 is a schematic diagram of a stator vane assembly according to an exemplary embodiment of the present disclosure and that can be utilized on the aircraft of FIG. 1.
Figure 4:
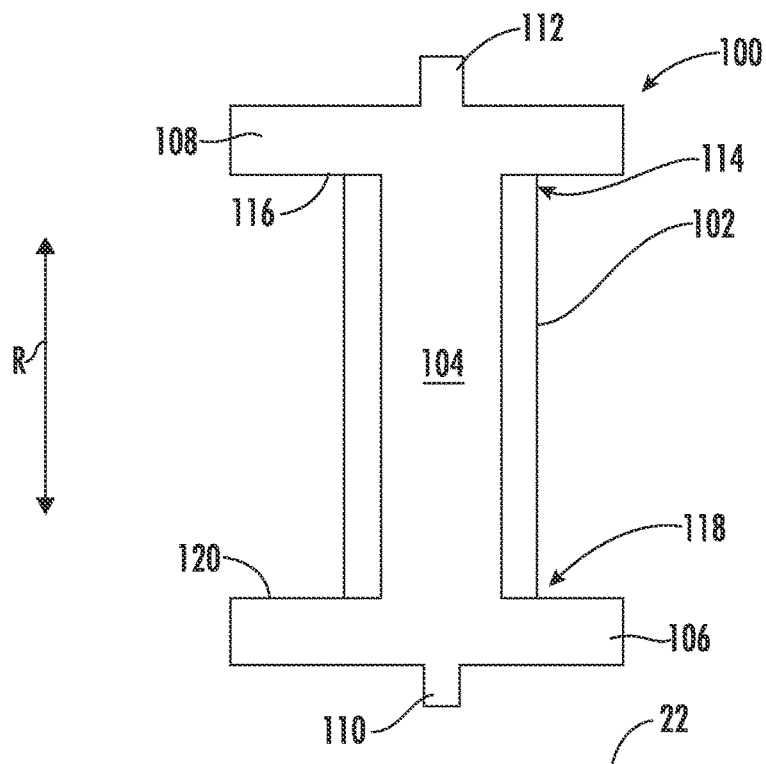
FIG. 4 is a schematic diagram of a portion of the stator vane assembly as shown in FIG. 3.

FIG. 3 provides a schematic diagram of an exemplary stator vane assembly 100, according to various embodiments of the present disclosure. FIG. 4 provides a schematic diagram of a portion of the stator vane assembly 100 as shown in FIG. 3. As shown in FIG. 3, the stator vane assembly 100 includes a plurality of stator vanes 102. It should be noted that the number of stator vanes 102 shown in FIG. 3 is not limiting, and that the stator vane assembly 100 may include more stator vanes 102 or less stator vanes 102 than is shown.

As shown in FIGS. 3 and 4 collectively, each stator vane 102 includes a cooling cavity 104 defined therein. It will be understood that this need not be the case and any number and suitable configuration of stator vanes 102 can include a corresponding cooling cavity 104. In exemplary embodiments, each stator vane 102 extends radially between an inner-ring manifold 106 and an outer-ring manifold 108. The inner-ring manifold 106 includes an opening 110 for allowing fluid to flow into or out of the inner-ring manifold 106. The outer-ring manifold 108 includes an opening 112 for allowing fluid to flow into or out of the outer-ring manifold 108. Each cooling cavity 104 is in fluid communication with the inner-ring manifold 106 and the outer-ring manifold 108. Cooling cavity 104 may be formed by one or more channels, slots, chambers or the like defined within a respective stator vane 102, which allows a cooling fluid to flow between the inner-ring manifold 106 and the outer-ring manifold 108.

In exemplary embodiments, as shown in FIGS. 3 and 4 collectively, each stator vane 102 includes a radially outer portion 114 with respect to radial direction R and axial centerline 22 that is rigidly connected to an inner-surface 116 of the outer-ring manifold 108. Each stator vane 102 also includes a radially inner portion 118 with respect to radial direction R and axial centerline 22 that is rigidly connected to an outer surface 120 of the inner-ring manifold 106.

Figure 5:
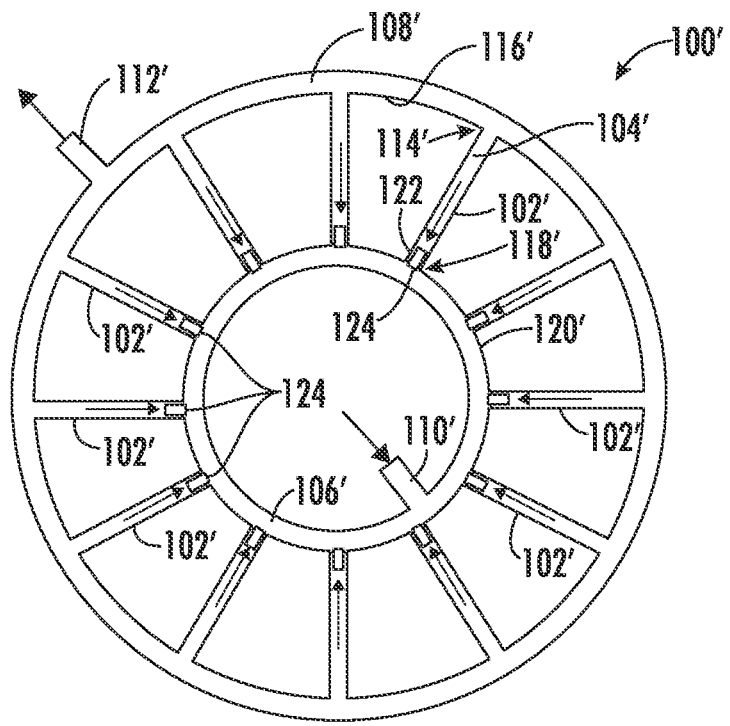
FIG. 5 is a schematic diagram of a stator vane assembly according to an exemplary embodiment of the present disclosure and that can be utilized on the aircraft of FIG. 1.
Figure 6:
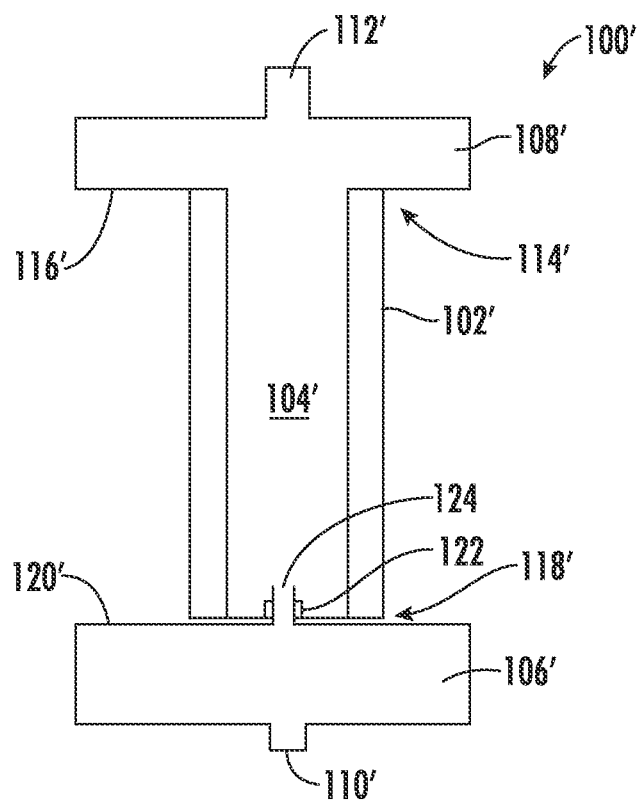
FIG. 6 is a schematic diagram of a portion of the stator vane assembly as shown in FIG. 5.

FIG. 5 provides a schematic diagram of the exemplary stator vane assembly 100, according to exemplary embodiments of the present disclosure. FIG. 6 provides a schematic diagram of a portion of the stator vane assembly 100 as shown in FIG. 5. In certain embodiments, as shown in FIGS. 5 and 6 collectively, the radially outer portion 114' of each stator vane 102' is rigidly connected to the inner-surface 116' of the outer-ring manifold 108'. The radially inner portion 118' is fluidly coupled to the inner-ring manifold 106' by a coupler 122. The coupler 122 mates with a corresponding nipple or nozzle 124 that extends radially outwardly from the outer surface 120' of the inner-ring manifold 106'.

The nozzle 124 and the coupler 122 provide for fluid communication between the inner-ring manifold 106' and the cooling cavity 104' of the respective stator vane 102' of the plurality of stator vanes 102'. As shown in FIG. 5, the stator vane assembly 100' includes a plurality of the nozzles 124 circumferentially spaced along the outer surface 120' of the inner-ring manifold 106' so that each nozzle 124 aligns with a respective stator vane 102'. The nozzles 124 may be used to properly align each stator vane 102' within the stator vane assembly 100'. In particular embodiments, a seal (not shown) may be disposed between the radially inner portion 118' of each stator vane 102' and the outer surface 120' of the inner-ring manifold 106'.

Referring now back to FIG. 2, the exemplary embodiments of the stator vane assembly 100 detailed in FIGS. 3, 4, 5, and 6 may be integrated into the compressor section 32 (low-pressure compressor 34 and high-pressure compressor 36) and the turbine section 40 (high-pressure turbine 42 and the low-pressure turbine 44) of the gas turbine engine 20.

Figure 7:
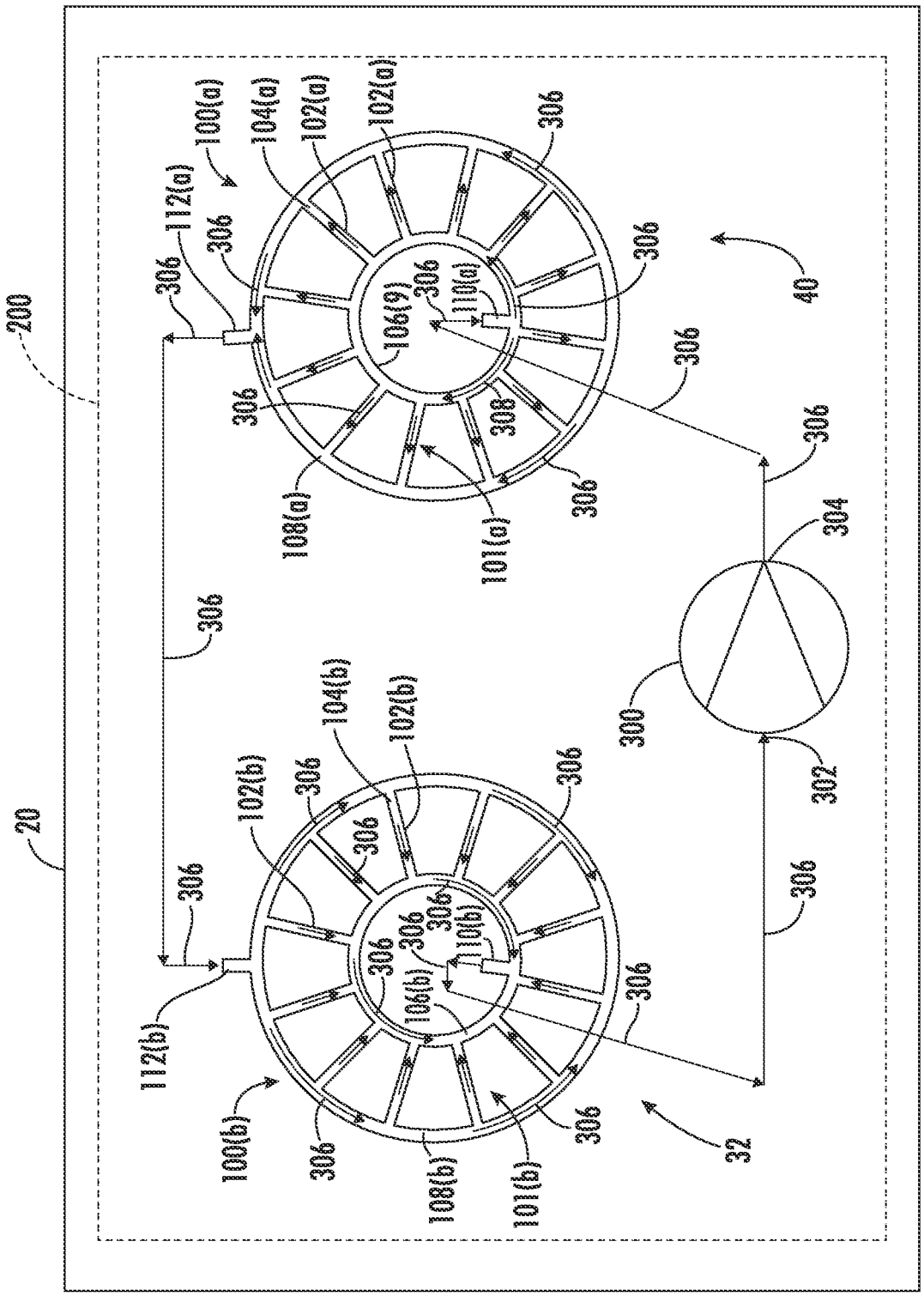
FIG. 7 is a schematic diagram illustration of a closed-loop cooling system for cooling stator vanes of a gas turbine engine according to an exemplary embodiment of the present disclosure and that can be utilized on the aircraft of FIG. 1.

FIG. 7 is a schematic diagram of a closed-loop cooling system 200 or "system" for cooling stator vanes of a gas turbine engine according to an exemplary embodiment of the present disclosure. As shown in FIG. 7, the closed-loop cooling system 200 generally includes a pump 300 having a pump inlet 302 and a pump outlet 304, a first stator vane assembly 100(a) including a first plurality of stator vanes 102(a) with each stator vane 102(a) of the first plurality of stator vanes 102(a) having a cooling cavity 104(a) defined therein. The closed-loop cooling system 200 further includes a second stator vane assembly 100(b) including a first plurality of stator vanes 102(b) with each stator vane 102(b) of the first plurality of stator vanes 102(b) having a cooling cavity 104(b) defined therein. In operation, the pump 300 drives a working fluid 306 from the pump outlet 304, through the cooling cavities 104(a) of the stator vanes 102(a) of the first plurality of stator vanes 102(a), through the cooling cavities 104(b) of the stator vanes 102(b) of the first plurality of stator vanes 102(b) and back to the pump inlet 302, thus forming a closed-loop cooling circuit. In this configuration, the first stator vane assembly 100(a) acts as the heat-source and the second stator vane assembly 100(b) acts as the heat-sink.

In exemplary embodiments, the stator vanes 102(a) of the first plurality of stator vanes 102(a) extend radially between a first inner-ring manifold 106(a) and a first outer-ring manifold 108(a) of the first stator vane assembly 100(a). Each of the cooling cavities 104(a) of the stator vanes 102(a) of the first plurality of stator vanes 102(a) is in fluid communication with the first inner-ring manifold 106(a) and the first outer-ring manifold 108(a). The first inner-ring manifold 106(a) includes opening 110(a). The opening 110(a) is fluidly coupled to the pump outlet 304 via pipes, conduits, or the like. Opening 112(a) of the first outer-ring manifold 108(a) provides for fluid communication between the cooling cavities 104(a) of the stator vanes 102(a) of the first plurality of stator vanes 102(a) and the cooling cavities 104(b) of the stator vanes 102(b) of the first plurality of stator vanes 102(b). In exemplary embodiments, the first stator vane assembly 100(a) is disposed in the turbine section 40 of the gas turbine engine 20 and the second stator vane assembly 100(b) is disposed in the compressor section 32 of the gas turbine engine 20. In other embodiments, the first stator vane assembly 100(a) is disposed in the high-pressure compressor 36 of the gas turbine engine 20 and the second stator vane assembly 100(b) is disposed in the low-pressure compressor 34 of the gas turbine engine 20. In other embodiments, the first stator vane assembly 100(a) is disposed in the high-pressure turbine 42 of the gas turbine engine 20 and the second stator vane assembly 100(b) is disposed in the low-pressure turbine 44 of the gas turbine engine 20.

In exemplary embodiments, the stator vanes 102(b) of the first plurality of stator vanes 102(b) extend radially between a second inner-ring manifold 106(b) and a second outer-ring manifold 108(a) of the second stator vane assembly 100(b). Each of the cooling cavities 104(b) of the stator vanes 102(b) of the first plurality of stator vanes 102(b) is in fluid communication with the second inner-ring manifold 106(b) and the second outer-ring manifold 108(b). The second inner-ring manifold 106(b) includes opening 110(b). The opening 110(b) is fluidly coupled to the pump inlet 302 via pipes, conduits, or the like. Opening 112(b) of the second outer-ring manifold 108(b) provides for fluid communication between the cooling cavities 104(a) of the stator vanes 102(a) of the first plurality of stator vanes 102(a) and the cooling cavities 104(b) of the stator vanes 102(b) of the second plurality of stator vanes 102(b). More particularly, openings 112(a) and 112(b) provide for fluid communication between the first outer-ring manifold 108(a) and the second outer-ring manifold 108(b), and are fluidly coupled to each other via pipes, conduits, or the likes.

Figure 9:
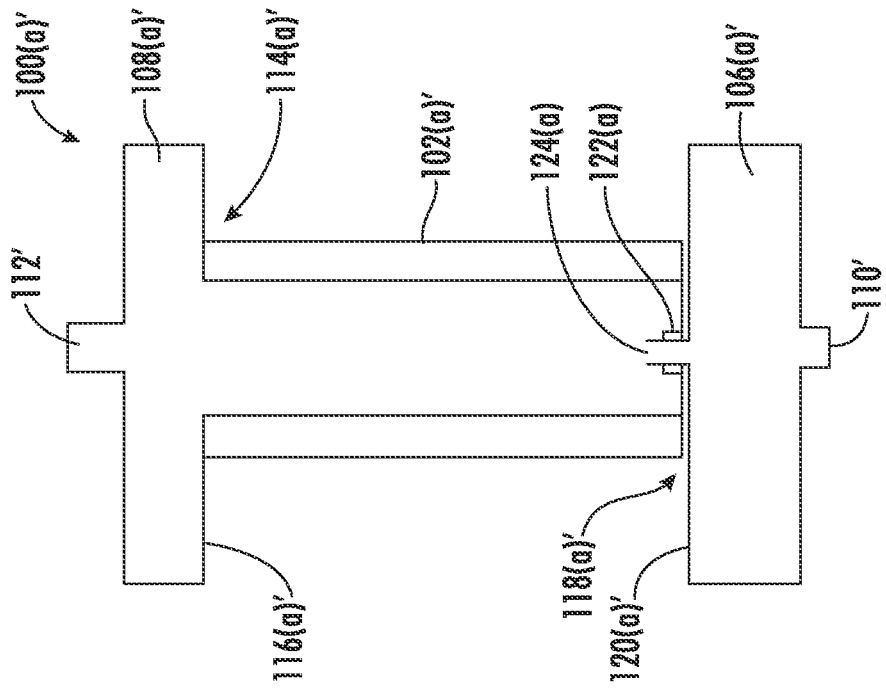
FIG. 9 is a schematic diagram of a portion of a stator vane assembly according to an exemplary embodiment of the present disclosure.
Figure 8:
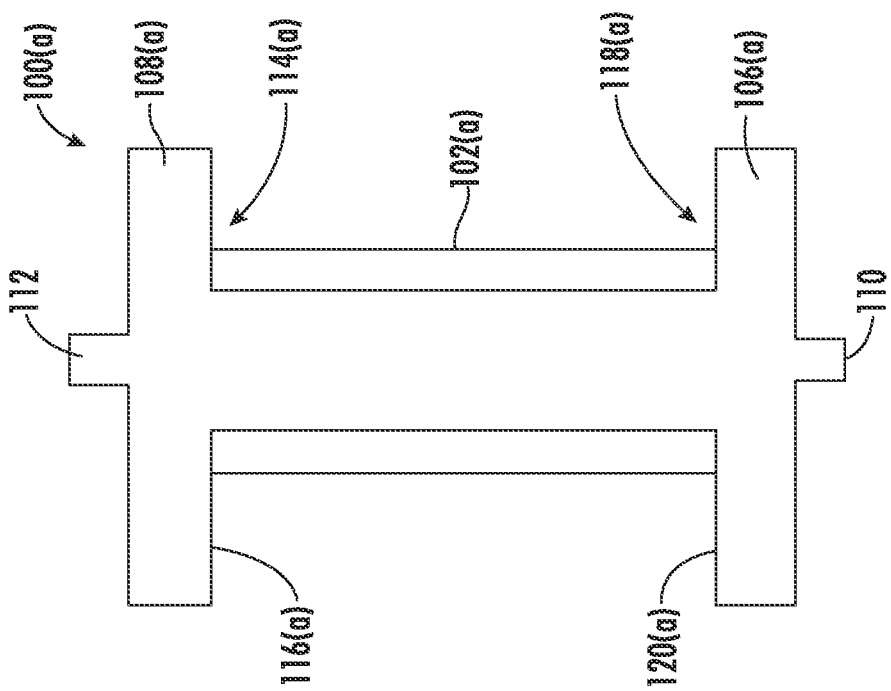
FIG. 8 is a schematic diagram of a portion of a stator vane assembly according to an exemplary embodiment of the present disclosure.

FIG. 8 and FIG. 9 provide schematic diagrams of a portion of the first stator vane assembly 100(a) according to exemplary embodiments of the present disclosure. In exemplary embodiments, as shown in FIG. 8, the radially inner portion 118(a) and radially outer portion 114(a) of stator vane 102(a) are rigidly connected to the outer surface 120(a) of first inner-ring manifold 106(a) and the inner surface 116(a) of the first outer-ring manifold 108(a) respectively. In an alternate embodiment, as shown in FIG. 9, radially outer portion 114(a)' of stator vane 102(a)' is rigidly connected to the inner surface 116(a)' of the first outer-ring manifold 108(a)' and the radially inner portion 118(a)' is fluidly connected to the first inner-ring manifold 106(a)' via nozzle 124(a) and coupler 122(a).

Figure 11:
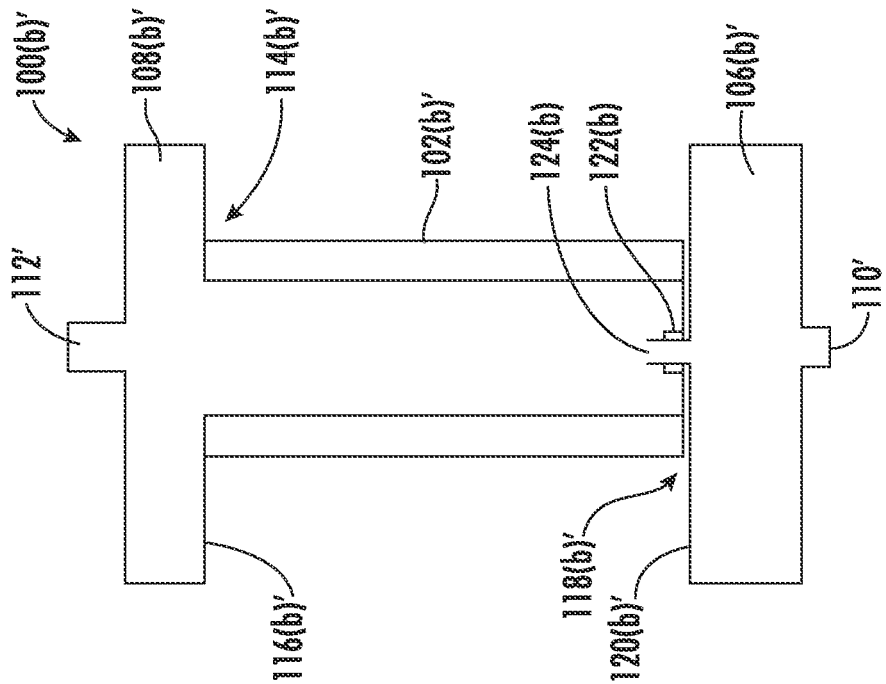
FIG. 11 is a schematic diagram of a portion of an exemplary stator vane assembly according to exemplary embodiments of the present disclosure.
Figure 10:
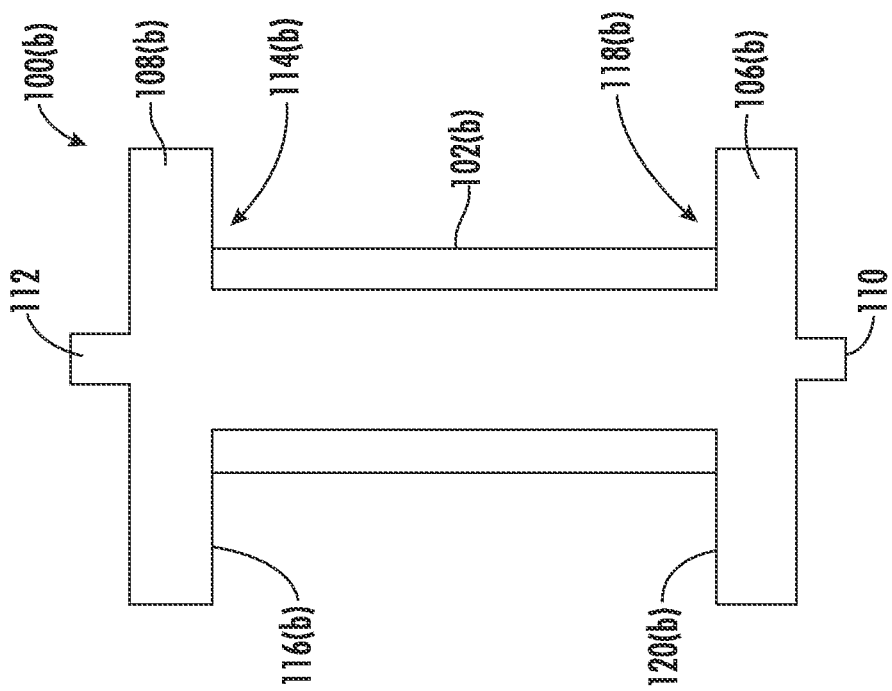
FIG. 10 is a schematic diagram of a portion of an exemplary stator vane assembly according to exemplary embodiments of the present disclosure.

FIG. 10 and FIG. 11 provide schematic diagrams of a portion of the second stator vane assembly 100(b) according to exemplary embodiments of the present disclosure. In exemplary embodiments, as shown in FIG. 10, radially inner portion 118(b) and radially outer portion 114(b) of stator vane 102(b) are rigidly connected to the outer surface 120(b) of second inner-ring manifold 106(b) and the inner surface 116(b) of the second outer-ring manifold 108(b) respectively. In an alternate embodiment, as shown in FIG. 11, radially outer portion 114(b)' of stator vane 102(b)' is rigidly connected to the inner surface 116(b)' of the second outer-ring manifold 108(b)' and the radially inner portion 118(b)' is fluidly connected to the second inner-ring manifold 106(b)' via nozzle 124(b) and coupler 122(b).

Figure 12:
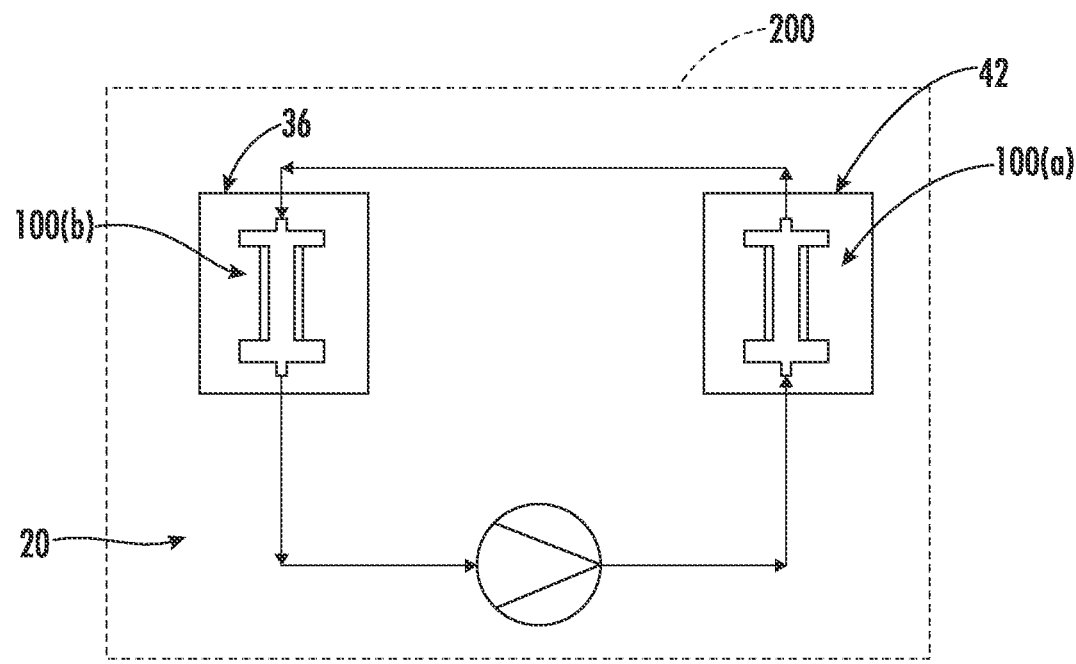
FIG. 12 is a schematic diagram of a closed-loop cooling system according to an exemplary embodiment of the present disclosure and that can be utilized on the aircraft of FIG. 1.

FIG. 12 provides a schematic diagram of the closed-loop cooling system 200 according to an exemplary embodiment of the present disclosure. In one embodiment, the first stator vane assembly 100(a), which acts as the heat-source, is integrated into the high-pressure turbine 42 of the gas turbine engine 20, and the second stator vane assembly 100(b), which acts as the heat-sink, is integrated into the high-pressure compressor 36 of the gas turbine engine 20.

Figure 13:
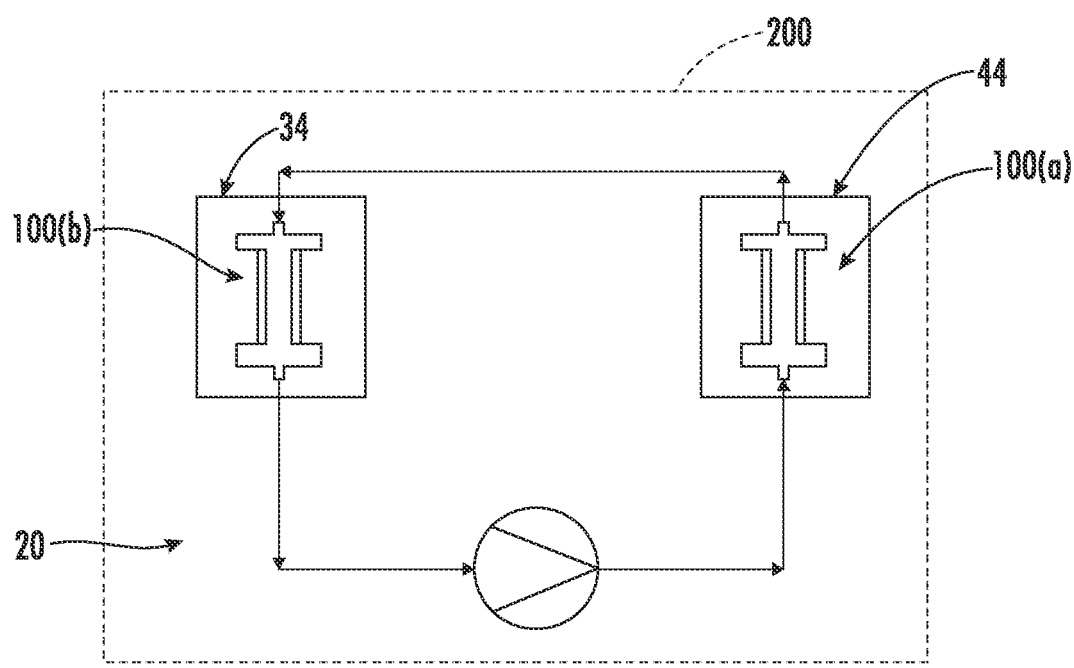
FIG. 13 is a schematic diagram of a closed-loop cooling system according to an exemplary embodiment of the present disclosure and that can be utilized on the aircraft of FIG. 1.

FIG. 13 provides a schematic diagram of the closed-loop cooling system 200 according to an exemplary embodiment of the present disclosure. In one embodiment, the first stator vane assembly 100(a), which acts as the heat-source, is integrated into the low-pressure turbine 44 of the gas turbine engine 20, and the second stator vane assembly 100(b), which acts as the heat-sink, is integrated into the low-pressure compressor 34 of the gas turbine engine 20.

Figure 14:
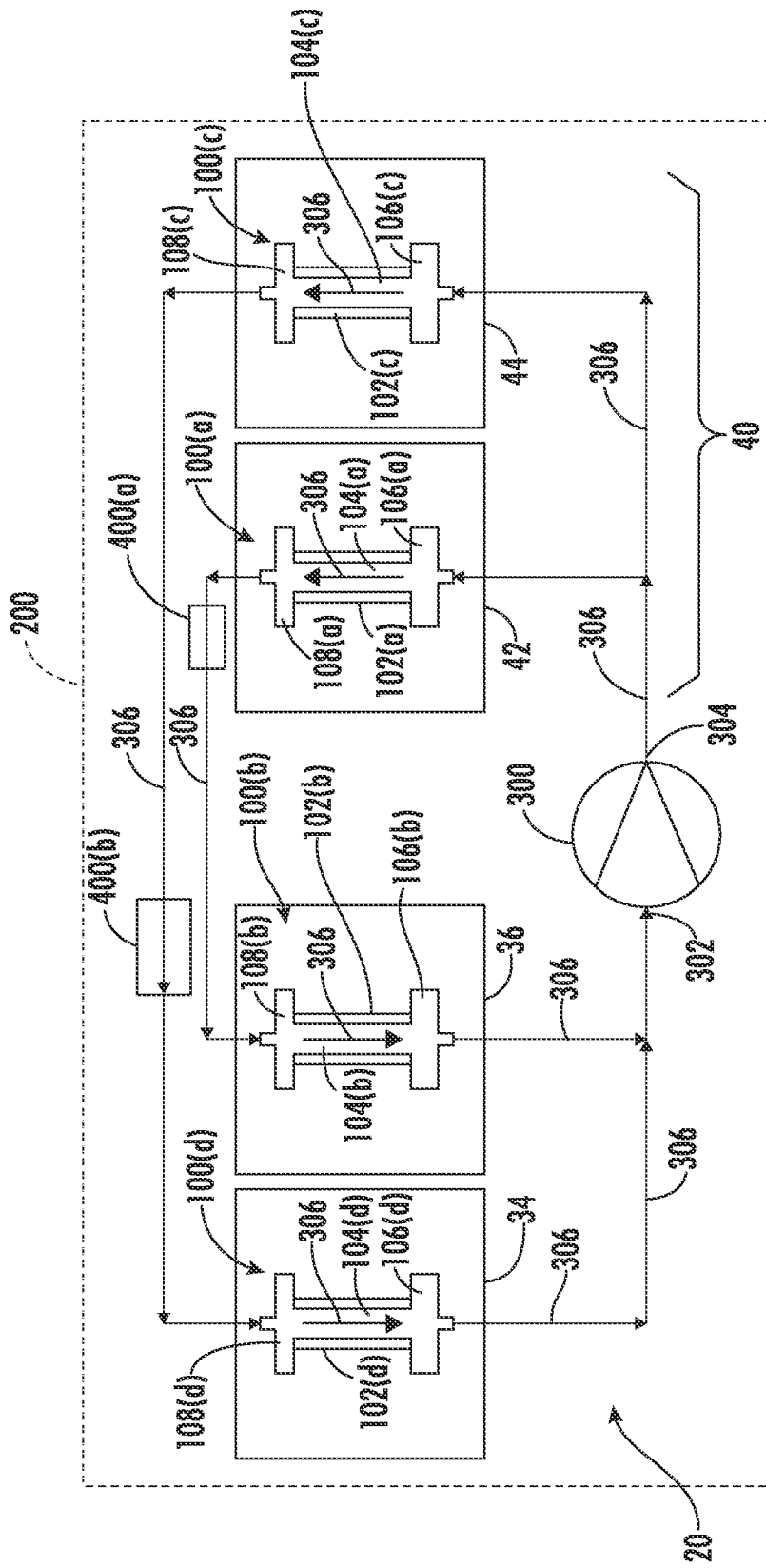
FIG. 14 is a schematic diagram of a closed-loop cooling system according to an exemplary embodiment of the present disclosure and that can be utilized on the aircraft of FIG. 1.

FIG. 14 provides a schematic diagram of the closed-loop cooling system 200 according to an exemplary embodiment of the present disclosure. As shown in FIG. 14, the closed-loop cooling system 200 may include additional stator vane assemblies configured similarly or the same as the exemplary stator vane assembly 100, or more particularly, the first stator vane assembly 100(a) and the second stator vane assembly 100(b). For example, in an exemplary embodiment, the closed-loop cooling system 200 includes the first stator vane assembly 100(a) disposed in the high-pressure turbine 42, the second stator vane assembly 100(b) disposed in the high-pressure compressor 36, a third stator vane assembly 100(c) disposed in the low-pressure turbine 44, and a fourth stator vane assembly 100(d) disposed in the low-pressure compressor 34.

As shown in FIG. 14, the pump outlet 304 is fluidly coupled to first inner-ring manifold 106(a) of the first stator vane assembly 100(a), and to third inner-ring manifold 106(c) of the third stator vane assembly 100(c). The first outer-ring manifold 108(a) is fluidly coupled to the second outer-ring manifold 108(b), and outer-ring manifold 108(c) of the third stator vane assembly 100(c) is fluidly coupled to outer-ring manifold 108(d) of the fourth stator vane assembly 100(d). The second inner-ring manifold 106(b) and fourth inner-ring manifold of the fourth stator vane assembly 100(d) is fluidly coupled to the pump inlet 302.

In this configuration, the pump 300 drives a first portion of working fluid 306 from the pump outlet 304 to the first inner-ring manifold 106(a), through the cooling cavities 104(a) of each stator vane 102(a) and into the first outer-ring manifold 108(a). The working fluid 306 then flows to the second outer-ring manifold 108(b), through the cooling cavities 104(b), into the second inner-ring manifold 106(b) and back to the pump inlet 302.

A second portion of the working fluid 306 flows into the third inner-ring manifold 106(c), through the cooling cavities 104(c) of each stator vane 102(c) of a third plurality of stator vanes 102(c) and into the third outer-ring manifold 108(c). The second portion of the working fluid 306 then flows to the fourth outer-ring manifold 108(d), through the cooling cavities 104(d) of stator vanes 102(d) of a fourth plurality of stator vanes 102(d), into the fourth inner-ring manifold 106(d) and back to the pump inlet 302 in a closed-loop manner.

In additional embodiments, as shown in FIG. 14, the closed-loop cooling system 200 may further include at least one heat exchanger 400 to enable higher cooling load and provide controlled cooling to the working fluid 306 downstream from the heat-source (e.g. turbine section 40) and upstream from the pump inlet 302. In a particular embodiment, at least one heat exchanger 400(a) is disposed between the first outer-ring manifold 108(a) and the second outer-ring manifold 108(b). In a particular embodiment, at least one heat exchanger 400(b) is disposed between the third outer-ring manifold 108(c) and the fourth outer-ring manifold 108(d).

Figure 15:
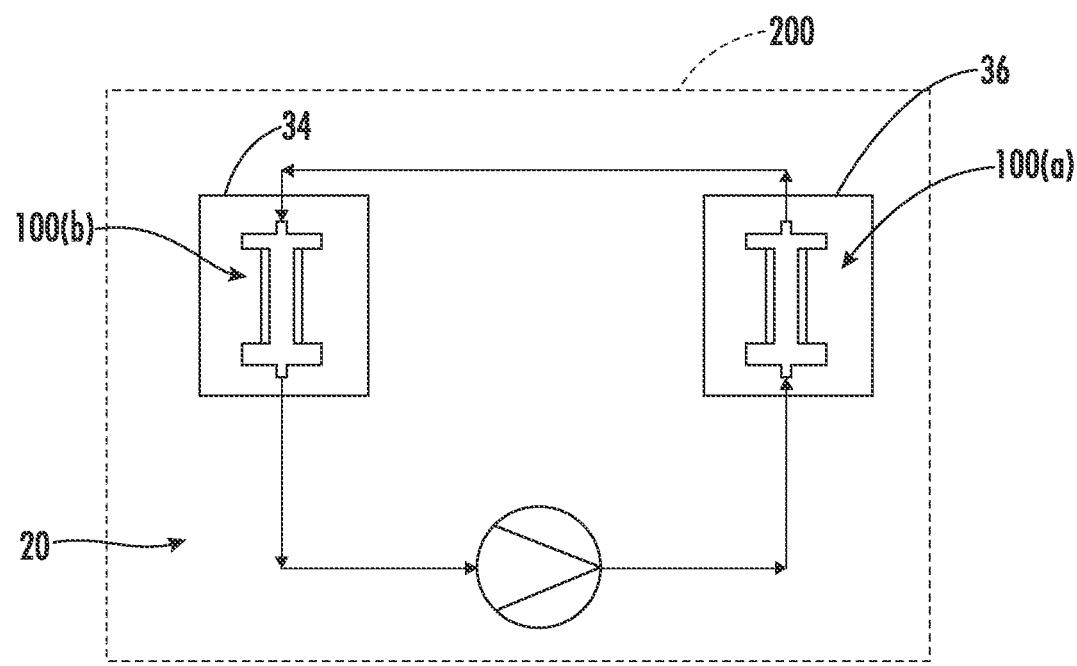
FIG. 15 is a schematic diagram of a closed-loop cooling system according to an exemplary embodiment of the present disclosure and that can be utilized on the aircraft of FIG. 1.

FIG. 15 provides a schematic diagram of the closed-loop cooling system 200 according to an exemplary embodiment of the present disclosure. In one embodiment, the first stator vane assembly 100(a), which acts as the heat-source, is integrated into the high-pressure compressor 36 of the gas turbine engine 20, and the second stator vane assembly 100(b), which acts as the heat-sink, is integrated into the low-pressure compressor 34 of the gas turbine engine 20.

Figure 16:
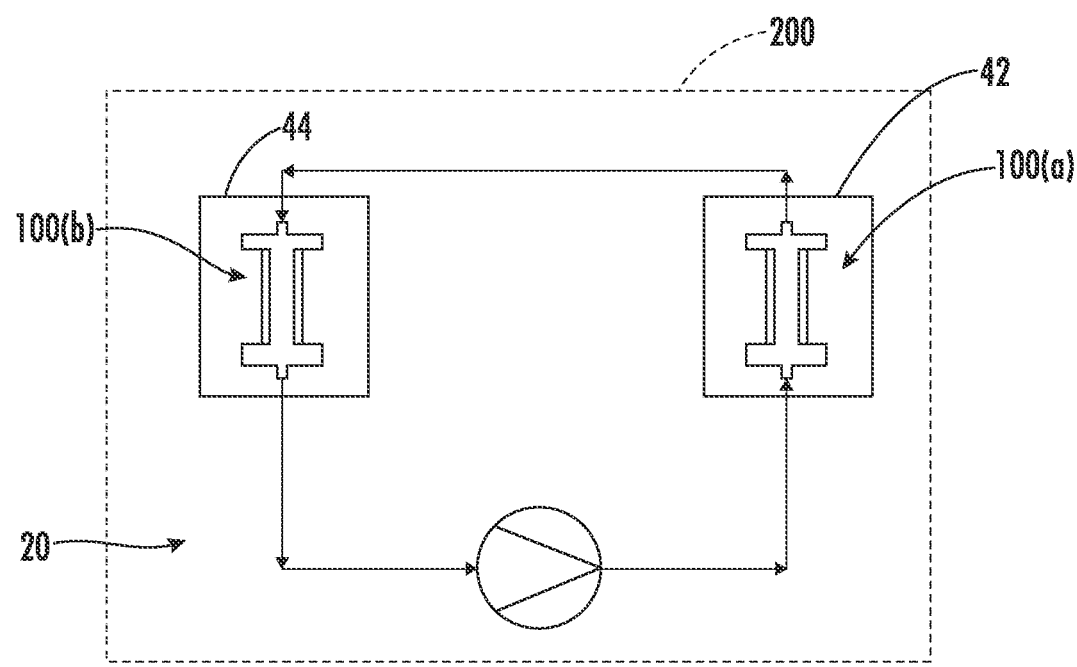
FIG. 16 is a schematic diagram of a closed-loop cooling system according to an exemplary embodiment of the present disclosure and that can be utilized on the aircraft of FIG. 1.

FIG. 16 provides a schematic diagram of the closed-loop cooling system 200 according to an exemplary embodiment of the present disclosure. In one embodiment, the first stator vane assembly 100(a), which acts as the heat-source, is integrated into the high-pressure turbine 42 of the gas turbine engine 20, and the second stator vane assembly 100(b), which acts as the heat-sink, is integrated into the low-pressure turbine 44 of the gas turbine engine 20.

In other embodiments (not shown), at least one heat exchanger 400 is disposed between the first stator vane assembly 100(a) in the high-pressure compressor 36 and the second stator vane assembly 100(b) in the low-pressure compressor 34. In other embodiments (not shown), at least one heat exchanger 400 is disposed between the first stator vane assembly 100(a) in the high-pressure turbine 42 and the second stator vane assembly 100(b) in the low-pressure turbine 44. The heat exchanger(s) 400, 400(a-b) may use various heat-sink fluids such as, but not limited to, ambient air, fuel, hydrogen fuel, oil or any other suitable fluid. The closed-loop cooling system may use working fluids such as, but not limited to, water, air, or any other suitable working fluid.

Figure 17:
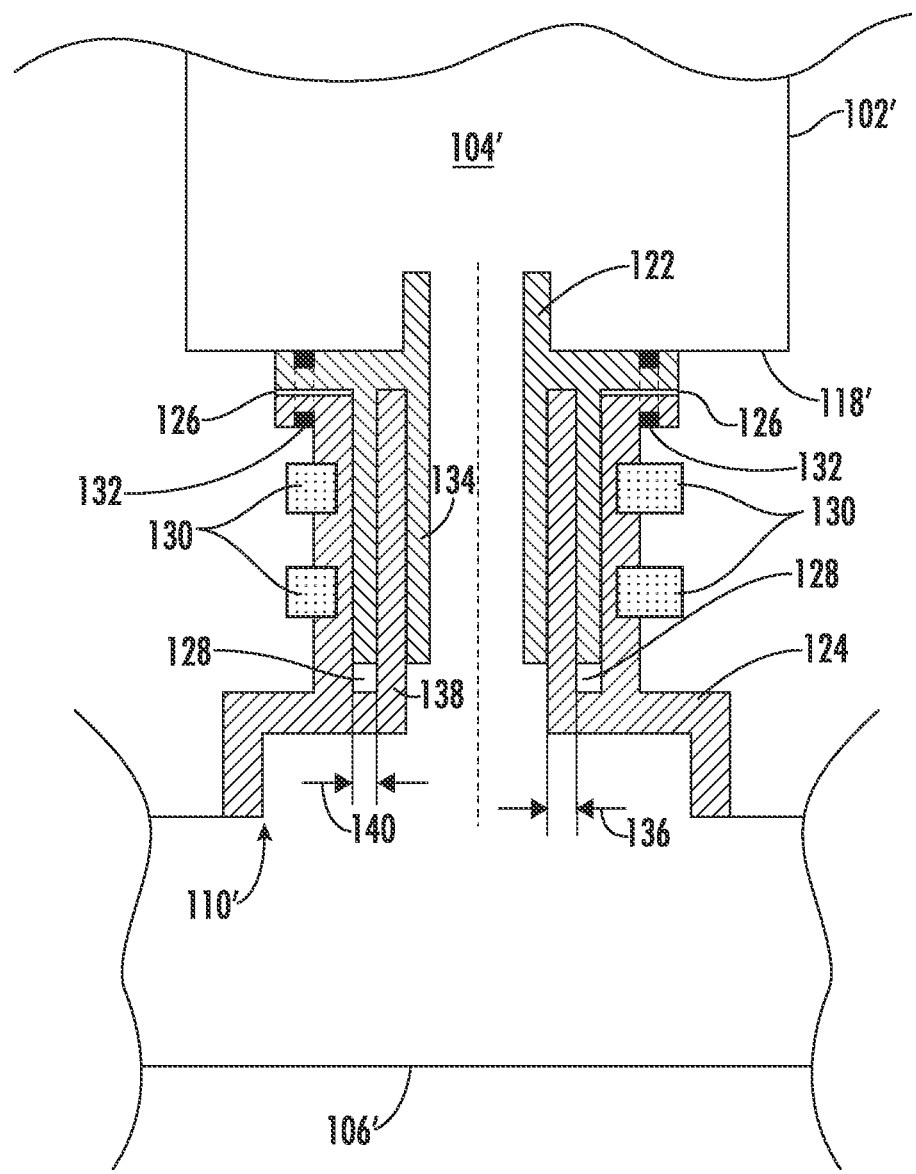
FIG. 17 is a schematic diagram of a coupler and a nozzle according to an exemplary embodiment of the present disclosure and that can be utilized on the aircraft of FIG. 1.

FIG. 17 is a schematic diagram of coupler 122 and nozzle 124 according to an exemplary embodiment of the present disclosure. As shown in FIG. 17, the coupler 122 mates or is seated into the nozzle 124. In exemplary embodiments, a seal or gasket 126 may be disposed between mating surfaces of the nozzle 124 and coupler 122. In exemplary embodiments, a radial gap or space 128 may be provided between the coupler 122 and the nozzle 124 to allow for to enable axial thermal expansion of the components during operation of the gas turbine engine. In certain embodiments, one or more expandable pipe clamp(s) 130 are used to provide a clamping or sealing force between the nozzle 124 and the coupler 122. Pipe clamp(s) 130 enable radial coupling of the coupler 122 and nozzle 124 while still allowing radial thermal expansion. Multiple fasteners 132 such as bolts and nuts may be used to enable axial coupling of the coupler/manifold sections.

In particular embodiments, mating portion 134 of the coupler 122 forms a slot 136 for mating or interlocking with a complementary mating portion 138 of the nozzle 124. The complementary mating portion 138 of the nozzle 124 may also be formed as a slot 140. Due to the high-temperature operation of the turbine and compressor sections, the coupler 122 and nozzle 124 should be formed from materials resistant to plastic deformation and creep. These materials should have recoverable transformation strain levels and have long term stability. Exemplary materials for the coupler 122 and nozzle 124 material include, but are not limited to, high temperature shape memory alloy such as Ti—Ni—Pd, Ti—Ni—Pt, Ru—Ta, Ru—Nb, and Mn—Pd.

As show in FIG. 17, the nozzle 124 may be fixed to the inner-ring manifold 106 to form a hermetic seal around the inner-ring manifold opening 110'. The coupler 122 is fixed to the radially inner portion 118' of the stator vane 102'. The coupler 122 mates with the nozzle 124 to form a hermetic seal therebetween.

Figure 18:
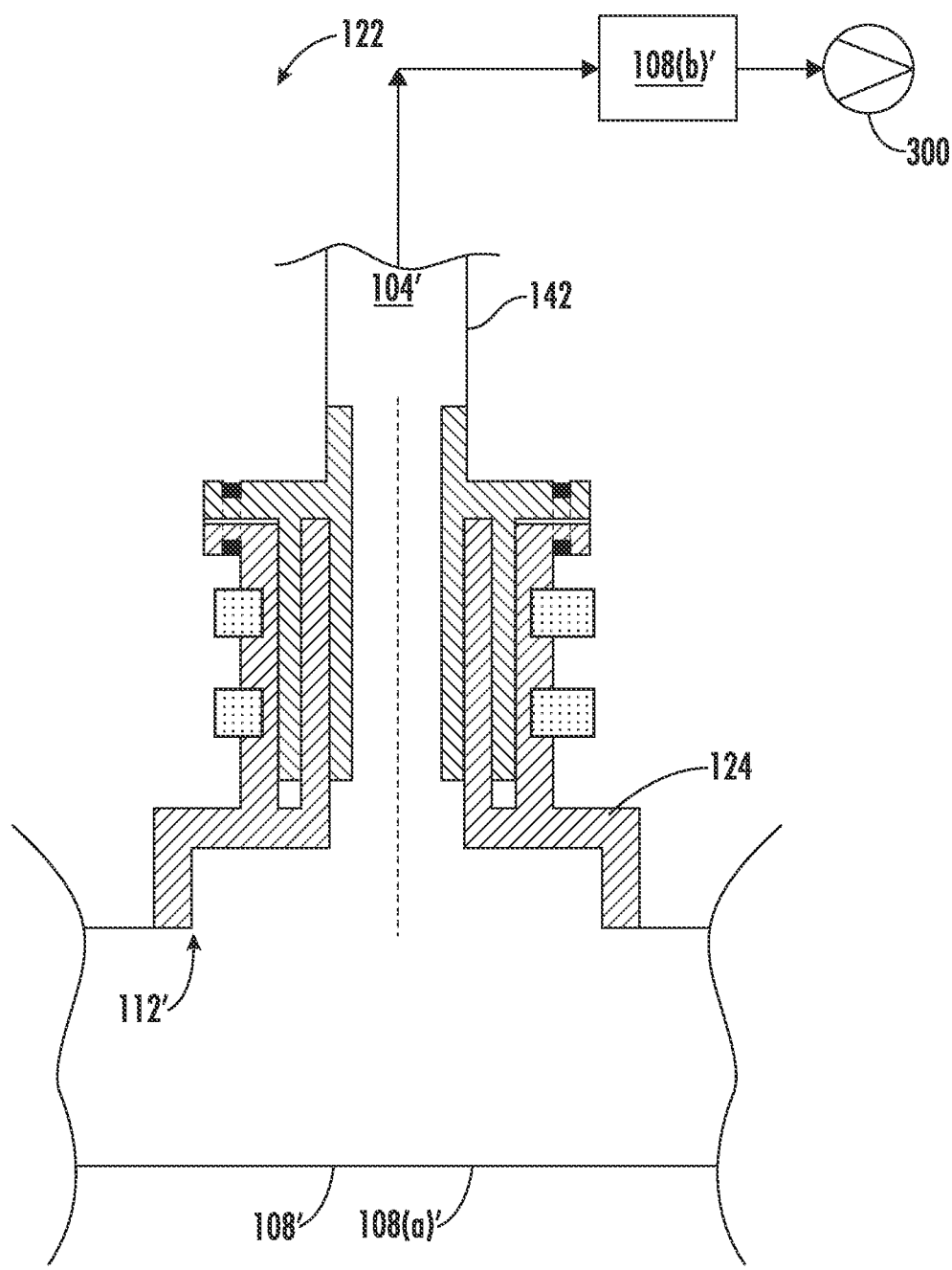
FIG. 18 is a schematic diagram of a coupler and a nozzle according to an exemplary embodiment of the present disclosure.

FIG. 18 is a schematic diagram of coupler 122 and nozzle 124 according to an exemplary embodiment of the present disclosure. As show in FIG. 18, the nozzle 124 may be fixed to the outer-ring manifold 108' to form a hermetic seal around the outer-ring manifold opening 112'. The coupler 122 is fluidly coupled to one or more pipes or conduits 142 that that provides for fluid communication from the outer-ring manifold 108' to the pump 300 or in alternate embodiments, from a first outer-ring manifold 108(a)' to a second outer-ring manifold 108(b)' which is fluidly coupled to pump 300. In exemplary embodiments, the coupler 122 mates with the nozzle 124 to form a hermetic seal between the outer-ring manifold 108' and the one or more pipes or conduits 142.

It will be appreciated from the description herein, that the present disclosure may further include one or more methods of operating an aircraft or more specifically, a gas turbine engine. For example, in one exemplary aspect, a method of operating an aircraft with a gas turbine engine including a closed-loop cooling system is provided. The method may be utilized with one or more of the components described above.

The method includes flowing a working fluid from a pump, through a first plurality of cooling cavities defined in a first plurality of stator vanes disposed in a heat-source, e.g. the turbine section of the gas turbine engine. Flowing the working fluid from the first plurality of cooling cavities to a second plurality of cooling cavities defined in a second plurality of stator vanes disposed in a heat-sink, e.g. the compressor section of the gas turbine engine. The method can also include flowing a working fluid between a first and second plurality of stator vanes from two stages of a compressor section e.g. between the high-pressure compressor (the heat-source) and low-pressure compressor (the heat-sink) or between two stages of a turbine section e.g. between the high-pressure turbine (the heat-source) and low-pressure turbine (the heat-sink). The method further includes flowing the working fluid from the second plurality of cooling cavities to an inlet of the pump. The method may further include passing the working fluid through a heat exchanger downstream from the first plurality of cooling cavities and upstream from the second plurality of cooling cavities.

The closed-loop cooling system as disclosed herein ensures that heat load from each first plurality of cooling cavities of a particular stage of turbine or compressor stator vanes is distributed to a second plurality of cooling cavities of one or more stages of stator vanes such as compressor or turbine stator vanes. When the second plurality of stator vanes is positioned within the compressor, the closed-loop cooling system will cool the first plurality of stator vanes while also incrementally increasing the core air temperature which can reduce the amount of fuel needed to maintain an equivalent combustion efficiency. The addition of one or more heat exchangers allows for thermal management of the working fluid upstream from the second plurality of cooling cavities.

The closed-loop cooling system disclosed herein enables higher engine operation temperature, which increases engine efficiency. In addition, the closed-loop cooling system can potentially reduce engine size by reducing the need for a high number of high-pressure turbine and low-pressure turbine stages, and provides controlled high-cooling load capacity, which would decrease high-temperature induced stress on the vanes and increase vane lifespan. In addition, controlled high-cooling capacity can also reduce need for expensive high-temperature metal alloys for the high-pressure and low-pressure turbine stator vanes.

Further aspects are provided by the subject matter of the following clauses:

A closed-loop cooling system for a gas turbine engine, comprising: a pump having a pump inlet and a pump outlet; a first plurality of stator vanes defining first cooling cavities therein; and a second plurality of stator vanes, defining second cooling cavities therein, wherein the pump drives a working fluid from the pump outlet, through the first cooling cavities of the first plurality of stator vanes, through the cooling cavities of the second plurality of stator vanes and back to the pump inlet.

The closed-loop cooling system as in the preceding clause, wherein the first plurality of stator vanes is disposed within a turbine section of the gas turbine engine, and the second plurality of stator vanes is disposed within a compressor section of the gas turbine engine.

The closed-loop cooling system as in any preceding clause, wherein the first plurality of stator vanes is disposed within a high-pressure turbine section of the gas turbine engine, and the second plurality of stator vanes is disposed within a high-pressure compressor section of the gas turbine engine.

The closed-loop cooling system as in any preceding clause, wherein the first plurality of stator vanes is disposed within a low-pressure turbine section of the gas turbine engine, and the second plurality of stator vanes is disposed within a low-pressure compressor section of the gas turbine engine.

The closed-loop cooling system as in any preceding clause, further comprising: a third plurality of stator vanes defining third cooling cavities therein; and a fourth plurality of stator vanes defining fourth cooling cavities therein, wherein the pump inlet and the pump outlet are fluidly coupled to the third cooling cavities and the fourth cooling cavities.

The closed-loop cooling system as in any preceding clause, wherein the gas turbine engine includes a low-pressure compressor, a high-pressure compressor, a high-pressure turbine, and a low-pressure turbine, wherein the first plurality of stator vanes is disposed in the high-pressure turbine, the second plurality of stator vanes is disposed within the high-pressure compressor, the third plurality of stator vanes is disposed in the low-pressure turbine, and the fourth plurality of stator vanes is disposed in the low-pressure compressor.

The closed-loop cooling system as in any preceding clause, wherein the first plurality of stator vanes is disposed within a high-pressure compressor of the gas turbine engine, and the second plurality of stator vanes is disposed within a low-pressure compressor of the gas turbine engine.

The closed-loop cooling system as in any preceding clause, wherein the first plurality of stator vanes is disposed within a high-pressure turbine of the gas turbine engine, and the second plurality of stator vanes is disposed within a low-pressure turbine of the gas turbine engine.

The closed-loop cooling system as in any preceding clause, further comprising a heat exchanger, wherein the heat exchanger is fluidly coupled to the pump inlet and the pump outlet and wherein the heat exchanger is disposed downstream from the first cooling cavities and upstream from the second cooling cavities.

The closed-loop cooling system as in any preceding clause, further comprising: a first inner-ring manifold and a first outer-ring manifold, wherein the first plurality of stator vanes extend radially between the first inner-ring manifold and the first outer-ring manifold, wherein the pump and the first cooling cavities are fluidly coupled to the first inner-ring manifold and the first outer-ring manifold.

The closed-loop cooling system as in any preceding clause, wherein each of the first plurality of stator vanes further comprises a radially outer portion and a radially inner portion and wherein the radially outer portion is rigidly connected to an inner-surface of the first outer-ring manifold, and the radially inner portion is fluidly coupled to the first inner-ring manifold by a coupler and a nozzle.

The closed-loop cooling system as in any preceding clause, further comprising a nozzle and a coupler, wherein the nozzle is fixed to the first outer-ring manifold and the coupler is fluidly coupled to a pipe, wherein the pipe fluidly couples the first outer-ring manifold to the pump inlet, wherein mating portions of the coupler and the nozzle each form complementary slots that connect to form an interlocked hermetic joint therebetween.

The closed-loop cooling system as in any preceding clause, further comprising a second inner-ring manifold and a second outer-ring manifold, wherein the second plurality of stator vanes extend radially between the second inner-ring manifold and the second outer-ring manifold, wherein the pump and the second cooling cavities are fluidly coupled to the second inner-ring manifold and the second outer-ring manifold.

The closed-loop cooling system as in any preceding clause, wherein each of the second plurality of stator vanes further comprises a radially outer portion rigidly connected to an inner-surface of the second outer-ring manifold, and a radially inner portion that is fluidly coupled to the second inner-ring manifold by a coupler, wherein the coupler provides fluid communication between the second inner-ring manifold and the respective one of the second cooling cavities.

A gas turbine engine, comprising: a compressor section; a turbine section; and a closed-loop cooling system, the closed-loop cooling system comprising: a pump having a pump inlet and a pump outlet; a first plurality of stator vanes defining first cooling cavities therein; and a second plurality of stator vanes, defining second cooling cavities therein, wherein the pump drives a working fluid from the pump outlet, through the first cooling cavities of the first plurality of stator vanes, through the cooling cavities of the second plurality of stator vanes and back to the pump inlet.

The gas turbine engine as in the preceding clause, wherein the compressor section of the gas turbine engine includes a high-pressure compressor, and the turbine section includes a high-pressure turbine, wherein the first plurality of stator vanes is disposed in the high-pressure turbine and the second plurality of stator vanes is disposed within the high-pressure compressor.

The gas turbine engine as in any preceding clause, wherein the compressor section of the gas turbine engine includes a low-pressure compressor, and the turbine section includes a low-pressure turbine, wherein the first plurality of stator vanes is disposed in the low-pressure turbine and the second plurality of stator vanes is disposed within the low-pressure compressor.

The gas turbine engine as in any preceding clause, wherein the closed-loop cooling system further comprises a third plurality of stator vanes defining a third plurality of cooling cavities disposed within the turbine section, and a fourth plurality of stator vanes defining a fourth plurality of cooling cavities disposed within the compressor section; wherein the pump drives the working fluid from the pump inlet, through the first plurality of cooling cavities of the third plurality of stator vanes to the fourth plurality of cooling cavities of the fourth plurality of stator vanes and back to the pump inlet.

The gas turbine engine as in any preceding clause, wherein the compressor section of the gas turbine engine includes a low-pressure compressor and a high-pressure compressor, wherein the first plurality of stator vanes is disposed in the high-pressure compressor and the second plurality of stator vanes is disposed within the low-pressure compressor.

The gas turbine engine as in any preceding clause, wherein the turbine section of the gas turbine engine includes a high-pressure turbine and a low-pressure turbine, wherein the first plurality of stator vanes is disposed in the high-pressure turbine and the second plurality of stator vanes is disposed in the low-pressure turbine.

A closed-loop cooling system for a gas turbine engine, comprising a pump having a pump inlet and a pump outlet, a first plurality of stator vanes, each stator vane of the first plurality of stator vanes including a cooling cavity defined therein, and a second plurality of stator vanes. Each stator vane of the second plurality of stator vanes including a cooling cavity defined therein. Wherein the pump drives a working fluid from the pump outlet, through the cooling cavities of the stator vanes of the first plurality of stator vanes, through the cooling cavities of the stator vanes of the second plurality of stator vanes and back to the pump inlet.

The closed-loop cooling system as in the preceding clause, wherein the first plurality of stator vanes is disposed within a turbine section of the gas turbine engine, and the second plurality of stator vanes is disposed within a compressor section of the gas turbine engine.

The closed-loop cooling system as in any preceding clause, wherein the first plurality of stator vanes is disposed within a high-pressure turbine section of the gas turbine engine, and the second plurality of stator vanes is disposed within a high-pressure compressor section of the gas turbine engine.

The closed-loop cooling system as in any preceding clause, wherein the first plurality of stator vanes is disposed within a low-pressure turbine section of the gas turbine engine, and the second plurality of stator vanes is disposed within a low-pressure compressor section of the gas turbine engine.

The closed-loop cooling system as in any preceding clause, further comprising a third plurality of stator vanes where each stator vane of the third plurality of stator vanes includes a cooling cavity defined therein, and a fourth plurality of stator vanes. Each stator vane of the fourth plurality of stator vanes including a cooling cavity defined therein. Wherein the pump inlet and the pump outlet are fluidly coupled to the cooling cavities of the third and fourth pluralities of stator vanes.

The closed-loop cooling system as in any preceding clause, wherein the gas turbine engine includes a low-pressure compressor, a high-pressure compressor, a high-pressure turbine, and a low-pressure turbine. Wherein the first plurality of stator vanes is disposed in the high-pressure turbine, the second plurality of stator vanes is disposed within the high-pressure compressor, the third plurality of stator vanes is disposed in the low-pressure turbine and the fourth plurality of stator vanes is disposed in the low-pressure compressor.

The closed-loop cooling system as in any preceding clause, wherein the first plurality of stator vanes is disposed within a high-pressure compressor of the gas turbine engine, and the second plurality of stator vanes is disposed within a low-pressure compressor of the gas turbine engine.

The closed-loop cooling system as in any preceding clause, wherein the first plurality of stator vanes is disposed within a high-pressure turbine of the gas turbine engine, and the second plurality of stator vanes is disposed within a low-pressure turbine of the gas turbine engine.

The closed-loop cooling system as in any preceding clause, further comprising: a heat exchanger, wherein the heat exchanger is fluidly coupled to the pump inlet and the pump outlet and wherein the heat exchanger is disposed downstream from the cooling cavities of the first plurality of stator vanes and upstream from the cooling cavities of the second plurality of stator vanes.

The closed-loop cooling system as in any preceding clause, further comprising a first inner-ring manifold and a first outer-ring manifold. Wherein the stator vanes of the first plurality of stator vanes extend radially between the first inner-ring manifold and the first outer-ring manifold, wherein the pump and the cooling cavities of the stator vanes of the first plurality of stator vanes are fluidly coupled to the first inner-ring manifold and the first outer-ring manifold.

The closed-loop cooling system as in any preceding clause, wherein each stator vane of the first plurality of stator vanes includes a radially outer portion rigidly connected to an inner-surface of the first outer-ring manifold, and a radially inner portion that is fluidly coupled to the first inner-ring manifold by a coupler and a nozzle coupled to the inner-ring manifold, wherein the nozzle and coupler provides fluid communication between the first inner-ring manifold and the cooling cavity of a respective stator vane of the first plurality of stator vanes, and wherein mating portions of the coupler and the nozzle each form complementary slots that connect to form an interlocked hermetic joint therebetween.

The closed-loop cooling system as in any preceding clause, further comprising a nozzle and a coupler, wherein the nozzle is fixed to the outer-ring manifold and the coupler is fluidly coupled to a pipe, wherein the pipe is fluidly coupled to the pump inlet, wherein mating portions of the coupler and the nozzle each form complementary slots that connect to form an interlocked hermetic joint therebetween.

The closed-loop cooling system as in any preceding clause, further comprising a second inner-ring manifold and a second outer-ring manifold, wherein the stator vanes of the second plurality of stator vanes extend radially between the second inner-ring manifold and the second outer-ring manifold, wherein the pump and the cooling cavities of the stator vanes of the second plurality of stator vanes are fluidly coupled to the second inner-ring manifold and the second outer-ring manifold.

The closed-loop cooling system as in any preceding clause, wherein each stator vane of the second plurality of stator vanes includes a radially outer portion rigidly connected to an inner-surface of the second outer-ring manifold, and a radially inner portion that is fluidly coupled to the second inner-ring manifold by a coupler, wherein the coupler provides fluid communication between the second inner-ring manifold and the cooling cavity of a respective stator vane of the second plurality of stator vanes.

A gas turbine engine comprising a compressor section, a turbine section, and a closed-loop cooling system. The system comprising a pump having a pump inlet and a pump outlet, a first plurality of stator vanes disposed within the turbine section where each stator vane of the first plurality of stator vanes includes a cooling cavity defined therein, and a second plurality of stator vanes disposed within the compressor section where each stator vane of the second plurality of stator vanes includes a cooling cavity defined therein. Wherein the pump drives a working fluid from the pump outlet, through the cooling cavities of the stator vanes of the first plurality of stator vanes, through the cooling cavities of the stator vanes of the second plurality of stator vanes and back to the pump inlet.

The gas turbine engine as in the preceding clause, wherein the compressor section of the gas turbine engine includes a high-pressure compressor, and the turbine section includes a high-pressure turbine. Wherein the first plurality of stator vanes is disposed in the high-pressure turbine and the second plurality of stator vanes is disposed within the high-pressure compressor.

The gas turbine engine as in any preceding clause, wherein the compressor section of the gas turbine engine includes a low-pressure compressor, and the turbine section includes a low-pressure turbine, wherein the first plurality of stator vanes is disposed in the low-pressure turbine and the second plurality of stator vanes is disposed within the low-pressure compressor.

The gas turbine engine as in any preceding clause, wherein the closed-loop cooling system further comprises a third plurality of stator vanes disposed within the turbine section, each stator vane of the third plurality of stator vanes including a cooling cavity defined therein, and a fourth plurality of stator vanes disposed within the compressor section, each stator vane of the fourth plurality of stator vanes including a cooling cavity defined therein. Wherein the pump drives the working fluid from the pump inlet, through the cooling cavities of the stator vanes of the third plurality of stator vanes to the cooling cavities of the stator vanes of the fourth plurality of stator vanes and back to the pump inlet.

The gas turbine engine as in any preceding clause, wherein the compressor section of the gas turbine engine includes a low-pressure compressor and a high-pressure compressor, wherein the first plurality of stator vanes is disposed in the high-pressure compressor and the second plurality of stator vanes is disposed within the low-pressure compressor.

The gas turbine engine as in any preceding clause, wherein the turbine section of the gas turbine engine includes a high-pressure turbine and a low-pressure turbine, wherein the first plurality of stator vanes is disposed in the high-pressure turbine and the second plurality of stator vanes is disposed in the low-pressure turbine.

The gas turbine engine as in any preceding clause, wherein each stator vane of the first plurality of stator vanes includes a radially outer portion rigidly connected to an inner-surface of the first outer-ring manifold, and a radially inner portion that is fluidly coupled to the first inner-ring manifold by a coupler, wherein the coupler provides fluid communication between the first inner-ring manifold and the cooling cavity of a respective stator vane of the first plurality of stator vanes.

The gas turbine engine as in any preceding clause, wherein the turbine section of the gas turbine engine includes a high-pressure turbine and a low-pressure turbine, wherein the first plurality of stator vanes is disposed in the high-pressure turbine and the second plurality of stator vanes is disposed in the low-pressure turbine.

A method for operating an aircraft with a gas turbine engine includes flowing a working fluid from a pump through a first plurality of cooling cavities defined in a first plurality of stator vanes disposed in a turbine section of the gas turbine engine, flowing the working fluid from the first plurality of cooling cavities to a second plurality of cooling cavities defined in a second plurality of stator vanes disposed in a compressor section of the gas turbine engine, and flowing the working fluid from the second plurality of cooling cavities to an inlet of the pump.

The method as in the preceding clause further including passing the working fluid through a heat exchanger downstream from the first plurality of cooling cavities and upstream from the second plurality of cooling cavities.

The method as in any preceding clause further including passing the working fluid through a heat exchanger downstream from the second plurality of cooling cavities.

The method as in any preceding clause, wherein the first plurality of stator vanes is disposed in a high-pressure turbine of the turbine section, the second plurality of stator vanes is disposed within a high-pressure compressor of the compressor section.

The method as in any preceding clause, further comprising flowing the working fluid from the pump through a third plurality of cooling cavities defined in a third plurality of stator vanes disposed in the turbine section, flowing the working fluid from the third plurality of cooling cavities to a fourth plurality of cooling cavities defined in a fourth plurality of stator vanes disposed in the compressor section of the gas turbine engine, and flowing the working fluid from the fourth plurality of cooling cavities to an inlet of the pump.

The method as in any preceding clause, wherein the third plurality of stator vanes is disposed in a low-pressure turbine of the turbine section, and the fourth plurality of stator vanes is disposed within a low-pressure compressor of the compressor section.

This written description uses examples to disclose the present disclosure, including the best mode, and to also enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A closed-loop cooling system for a gas turbine engine, comprising:
    a pump having a pump inlet and a pump outlet;
    a first plurality of stator vanes defining first cooling cavities therein;
    a second plurality of stator vanes, defining second cooling cavities therein, wherein the pump drives a working fluid from the pump outlet, through the first cooling cavities of the first plurality of stator vanes, through the cooling cavities of the second plurality of stator vanes and back to the pump inlet;
    a first inner-ring manifold and a first outer-ring manifold, wherein the first plurality of stator vanes extend radially between the first inner-ring manifold and the first outer-ring manifold, wherein the pump and the first cooling cavities are fluidly coupled to the first inner-ring manifold and the first outer-ring manifold; and
    a nozzle and a coupler, wherein the nozzle is fixed to the first outer-ring manifold and the coupler is fluidly coupled to a pipe, wherein the pipe fluidly couples the first outer-ring manifold to the pump inlet, wherein mating portions of the coupler and the nozzle each form complementary slots that connect to form an interlocked hermetic joint therebetween.

2. The closed-loop cooling system as in claim 1, wherein the first plurality of stator vanes is disposed within a turbine section of the gas turbine engine, and the second plurality of stator vanes is disposed within a compressor section of the gas turbine engine.

3. The closed-loop cooling system as in claim 1, wherein the first plurality of stator vanes is disposed within a high-pressure turbine section of the gas turbine engine, and the second plurality of stator vanes is disposed within a high-pressure compressor section of the gas turbine engine.

4. The closed-loop cooling system as in claim 1, wherein the first plurality of stator vanes is disposed within a low-pressure turbine section of the gas turbine engine, and the second plurality of stator vanes is disposed within a low-pressure compressor section of the gas turbine engine.

5. The closed-loop cooling system as in claim 1, further comprising:
a third plurality of stator vanes defining third cooling cavities therein; and
a fourth plurality of stator vanes defining fourth cooling cavities therein, wherein the pump inlet and the pump outlet are fluidly coupled to the third cooling cavities and the fourth cooling cavities.

6. The closed-loop cooling system as in claim 5, wherein the gas turbine engine includes a low-pressure compressor, a high-pressure compressor, a high-pressure turbine, and a low-pressure turbine, wherein the first plurality of stator vanes is disposed in the high-pressure turbine, the second plurality of stator vanes is disposed within the high-pressure compressor, the third plurality of stator vanes is disposed in the low-pressure turbine, and the fourth plurality of stator vanes is disposed in the low-pressure compressor.

7. The closed-loop cooling system as in claim 1, wherein the first plurality of stator vanes is disposed within a high-pressure compressor of the gas turbine engine, and the second plurality of stator vanes is disposed within a low-pressure compressor of the gas turbine engine.

8. The closed-loop cooling system as in claim 1, wherein the first plurality of stator vanes is disposed within a high-pressure turbine of the gas turbine engine, and the second plurality of stator vanes is disposed within a low-pressure turbine of the gas turbine engine.

9. The closed-loop cooling system as in claim 1, further comprising a heat exchanger, wherein the heat exchanger is fluidly coupled to the pump inlet and the pump outlet and wherein the heat exchanger is disposed downstream from the first cooling cavities and upstream from the second cooling cavities.

10. The closed-loop cooling system as in claim 1, wherein each of the first plurality of stator vanes further comprises a radially outer portion and a radially inner portion and wherein the radially outer portion is rigidly connected to an inner-surface of the first outer-ring manifold, and the radially inner portion is fluidly coupled to the first inner-ring manifold by a coupler and a nozzle.

11. The closed-loop cooling system as in claim 1, further comprising a second inner-ring manifold and a second outer-ring manifold, wherein the second plurality of stator vanes extend radially between the second inner-ring manifold and the second outer-ring manifold, wherein the pump and the second cooling cavities are fluidly coupled to the second inner-ring manifold and the second outer-ring manifold.

12. The closed-loop cooling system as in claim 11, wherein each of the second plurality of stator vanes further comprises a radially outer portion rigidly connected to an inner-surface of the second outer-ring manifold, and a radially inner portion that is fluidly coupled to the second inner-ring manifold by a coupler, wherein the coupler provides fluid communication between the second inner-ring manifold and the respective one of the second cooling cavities.

13. A gas turbine engine, comprising:
a compressor section;
a turbine section; and
a closed-loop cooling system, the closed-loop cooling system comprising:
a pump having a pump inlet and a pump outlet;
a first plurality of stator vanes defining first cooling cavities therein;
a second plurality of stator vanes, defining second cooling cavities therein, wherein the pump drives a working fluid from the pump outlet, through the first cooling cavities of the first plurality of stator vanes, through the cooling cavities of the second plurality of stator vanes and back to the pump inlet;
a first inner-ring manifold and a first outer-ring manifold, wherein the first plurality of stator vanes extend radially between the first inner-ring manifold and the first outer-ring manifold, wherein the pump and the first cooling cavities are fluidly coupled to the first inner-ring manifold and the first outer-ring manifold; and
a nozzle and a coupler, wherein the nozzle is fixed to the first outer-ring manifold and the coupler is fluidly coupled to a pipe, wherein the pipe fluidly couples the first outer-ring manifold to the pump inlet, wherein mating portions of the coupler and the nozzle each form complementary slots that connect to form an interlocked hermetic joint therebetween.

14. The gas turbine engine as in claim 13, wherein the compressor section of the gas turbine engine includes a high-pressure compressor, and the turbine section includes a high-pressure turbine, wherein the first plurality of stator vanes is disposed in the high-pressure turbine and the second plurality of stator vanes is disposed within the high-pressure compressor.

15. The gas turbine engine as in claim 13, wherein the compressor section of the gas turbine engine includes a low-pressure compressor, and the turbine section includes a low-pressure turbine, wherein the first plurality of stator vanes is disposed in the low-pressure turbine and the second plurality of stator vanes is disposed within the low-pressure compressor.

16. The gas turbine engine as in claim 13, wherein the closed-loop cooling system further comprises a third plurality of stator vanes defining a third plurality of cooling cavities disposed within the turbine section, and a fourth plurality of stator vanes defining a fourth plurality of cooling cavities disposed within the compressor section;
wherein the pump drives the working fluid from the pump inlet, through the first plurality of cooling cavities of the third plurality of stator vanes to the fourth plurality of cooling cavities of the fourth plurality of stator vanes and back to the pump inlet.

17. The gas turbine engine as in claim 13, wherein the compressor section of the gas turbine engine includes a low-pressure compressor and a high-pressure compressor, wherein the first plurality of stator vanes is disposed in the high-pressure compressor and the second plurality of stator vanes is disposed within the low-pressure compressor.

18. The gas turbine engine as in claim 13, wherein the turbine section of the gas turbine engine includes a high-pressure turbine and a low-pressure turbine, wherein the first plurality of stator vanes is disposed in the high-pressure turbine and the second plurality of stator vanes is disposed in the low-pressure turbine.

* * * * *